(12) United States Patent
Grabau

(10) Patent No.: US 8,500,403 B2
(45) Date of Patent: Aug. 6, 2013

(54) ATTACHMENT DEVICES ON A WIND TURBINE BLADE AND A METHOD OF SERVICING UTILISING THESE DEVICE

(75) Inventor: Peter Grabau, Kolding (DK)

(73) Assignee: LM Glasfiber A/S, Lunderskov (DK)

( * ) Notice: Subject to any disclaimer, the term of this patent is extended or adjusted under 35 U.S.C. 154(b) by 869 days.

(21) Appl. No.: 11/992,185

(22) PCT Filed: Sep. 20, 2006

(86) PCT No.: PCT/DK2006/000516
§ 371 (c)(1),
(2), (4) Date: Feb. 2, 2010

(87) PCT Pub. No.: WO2007/033671
PCT Pub. Date: Mar. 29, 2007

(65) Prior Publication Data
US 2010/0129229 A1  May 27, 2010

(30) Foreign Application Priority Data

Sep. 21, 2005 (DK) .................................. 2005 01312

(51) Int. Cl.
*F03D 11/00* (2006.01)
(52) U.S. Cl.
USPC .............................................. 416/62; 416/63
(58) Field of Classification Search
USPC ............................ 416/5, 62, 63, 204 R, 248
See application file for complete search history.

(56) References Cited

FOREIGN PATENT DOCUMENTS

| DE | 27 53 956 B1 | 3/1979 |
|----|---|---|
| DE | 296 03 278 U1 | 4/1996 |
| JP | 55023372 A * | 2/1980 |
| JP | 04 237876 A | 8/1992 |
| WO | WO 03/100249 A1 | 12/2003 |
| WO | WO 2004/070203 A2 | 8/2004 |
| WO | WO 2005/071261 A1 | 8/2005 |
| WO | WO 2006/053554 A2 | 5/2006 |

* cited by examiner

*Primary Examiner* — Richard Edgar
(74) *Attorney, Agent, or Firm* — Nath, Goldberg & Meyer; Jerald L. Meyer; Sanjana Mangalagiri

(57) ABSTRACT

The present invention relates to a table for a wind turbine equipped with attachment devices 103 for attaching servicing equipment, 401, 402, said attachment means being attached at and accessible from the blade exterior. They may be located in cavities and be covered when not in use. Hereby it is accomplished that the blade can be serviced and repaired while positioned horizontally without the attachment devices as such otherwise influencing the aerodynamic properties of the blade. One possibility is that during manufacturing such a cavity is closed but the cavity can later be broken open. Additionally, the invention relates to a wind turbine featuring such blade and a method of servicing a blade when mounted on a wind turbine, wherein servicing equipment is attached to at least one attachment device in the blade. It is furthermore mentioned, that the attachment devices might be used when mounting a blade.

18 Claims, 8 Drawing Sheets

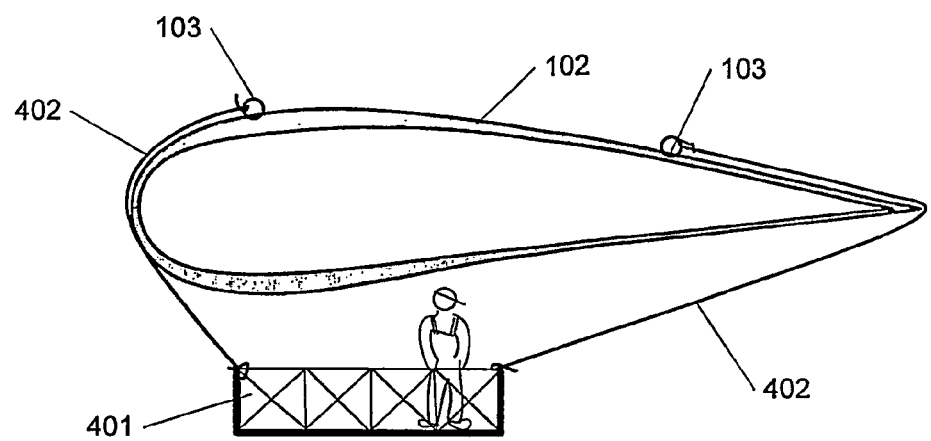
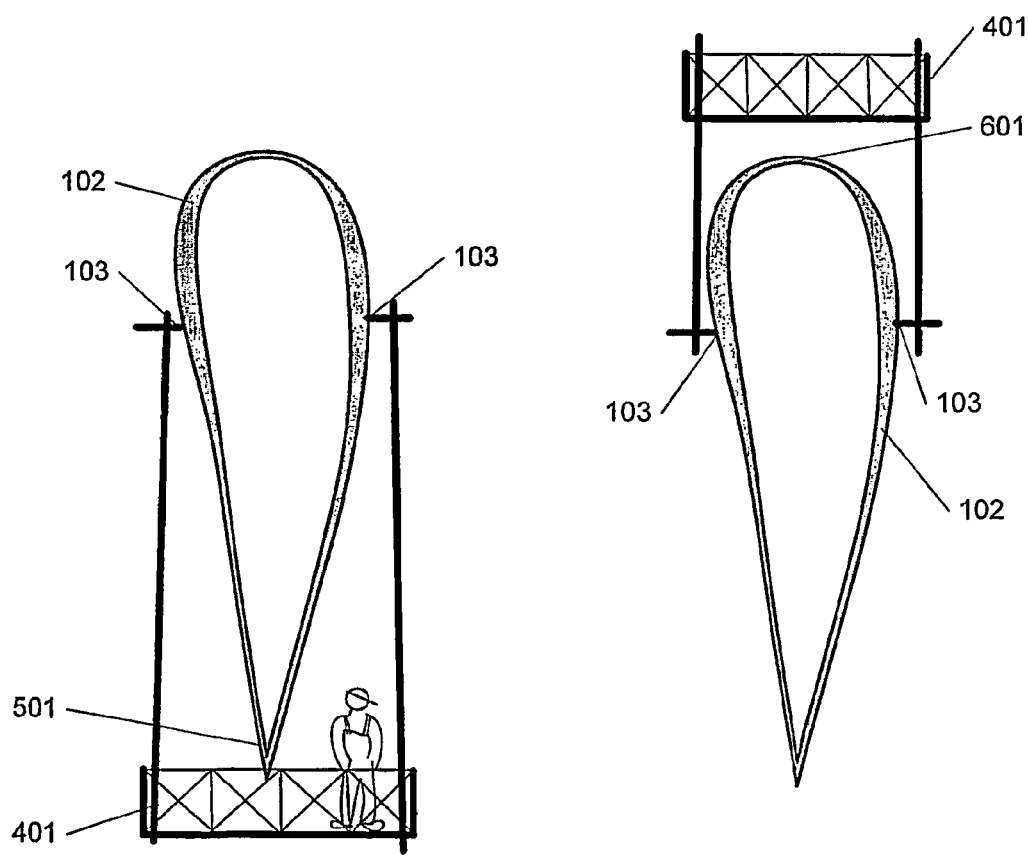
Fig. 4
Fig. 5
Fig. 6

ATTACHMENT DEVICES ON A WIND TURBINE BLADE AND A METHOD OF SERVICING UTILISING THESE DEVICE

The invention relates to a blade for a wind turbine and a method of servicing such blade mounted on a wind turbine.

BACKGROUND

Inspection and repair of blades on wind turbines are associated with high financial costs, on the one hand in the form of loss of earnings while the turbine is out of operation and, on the other, by the work itself. It is an option to dismount the damaged blade and mount another one straightaway, whereby the operation of the turbine can swiftly be resumed. However, the costs involved in such course of action are considerable, on the one hand for the new blade, on the other for crane, ship or helicopter for the mounting, to which is to be added that the replacement is possible only in calm weather conditions, which may pose a problem in particular in case of off-shore turbines.

Servicing and repair of the blade may in most instances, unless the damage is to extensive, also be performed while the blade is mounted on the wind turbine. This is usually done by means of various kinds of working platforms taken along the blade while it is in its vertical position down along the tower. The platforms are conveyed by cranes from heavy vehicles or ship and are connected to tower or hub. Alternatively, inspection can be performed by the crew rappelling down the blade from the nacelle which, however, is difficult to accomplish in adequately safe conditions. The use of both mobile cranes and ships with cranes is, however, as mentioned above, associated with high costs. Add to this that the area of repair is comparatively limited on a vertically situated blade, and that not all repairs can be suitably performed on a vertical face.

From WO 2004/070203 it is known to mount a blade on a wind turbine while the blade is kept in a horizontal position. In order to enable lifting of the blade, it is provided with one or two bores extending all the way through the blade shell, to which holes the lifting gear is mounted. The holes are closed following mounting to prevent ingress of water and soil and so as not to destroy the aerodynamic properties of the blade, and therefore they are not suitable for use in case of servicing and ordinary maintenance of the blade; they are useful only when the blade is being mounted. It is also a further considerable drawback of the method that holes through the entire blade shell will inevitably considerably reduce the strength and rigidity of the laminate and hence of the blade in a considerable area around the holes. Only very few holes with large mutual distances are therefore just barely acceptable, meaning that such holes are not applicable in servicing scenarios.

OBJECT AND DESCRIPTION OF THE INVENTION

It is the object of the invention to provide a method of servicing a blade, whereby it is possible to better check large areas of the blade in better conditions and in a more flexible manner and with less equipment.

Thus, the present invention relates to a blade for a wind turbine comprising at least one attachment device for attaching servicing equipment, which attachment device is attached at and is accessible from the blade exterior.

Hereby the advantage is obtained that servicing equipment, safety lines for crew, safety nets, working platforms, etc., can be attached to the blade in a simple and safe manner, while it is mounted on the wind turbine. Servicing and repair can thus be performed while the blade is in its horizontal state, whereby the use of expensive lifting equipment, such as cranes, etc., is obviated. The safety for the crew is also improved compared to rappelling, since they are hereby able to latch onto the blade in a safe manner. Moreover it is possible to service large areas of the blade at a time compared to a scenario where the blades are in their vertical position, which enables large-scale operations or improvements without an ensuing need to dismount the blade. By means of the attachment means it is also possible to cover large parts of the blade, whereby it is possible to control important parameters such as temperature and humidity during repairs, if any.

Also, the attachment means are advantageous when the blade is to be transported and mounted, since they enable improved control of the movements of the blade. Simultaneously a more even load distribution throughout the entire blade is obtained compared to lifting of the blade in a few straps as is conventionally done.

Moreover, the attachment devices can be used for securing eg aerodynamic features such as flaps or spoilers or for periodical suspension of advertising banners, etc.

One embodiment relates to a blade for a wind turbine in accordance with the above, wherein the attachment device is positioned to the effect that the surface of the blade is essentially even when the attachment device is not in use. Hereby it is ensured that the attachment means do not affect the aerodynamic properties of the blade during rotation and hence the yield of the wind turbine.

According to one embodiment the top face of the attachment device is flush with the blade surface when the attachment device is not in use.

According to yet an embodiment the attachment device is at least partially covered by a flap when the attachment device is not in use. Hereby it is ensured that the aerodynamic properties of the blade are maintained simultaneously with ensuring easy access to the attachment device from the blade exterior.

One embodiment of the invention further comprises a blade for a wind turbine according to all or parts of the above, wherein a number of attachment means are positioned downwards along the front and rear edges of the blade, to both sides of the blade and/or down along the main laminate of the blade. Hereby it is accomplished that the attachment devices are accessible from the major part of the blade which yields a higher degree of flexibility in connection with servicing and repair.

According to one embodiment of the invention the attachment device comprises a thread or an eye. Lines, bars and other kinds of parts of servicing equipment can thus in a simple and expedient manner be attached thereto and, likewise, it is possible to use standard equipment to a large extent.

According to one embodiment the blade comprises one or more attachment devices that also comprise means for light sources, wire conducting and/or lightning conducting. Hereby the advantageous aspect is accomplished that the devices are multifunctional and thus several functionalities can be incorporated into the same unit and mounted on or in the blade in one operation and in one place.

Moreover, the present invention relates to a wind turbine comprising at least one blade as described by one or more of the above embodiments. There advantages associated therewith are as described by a blade with attachment devices.

Additionally, the present invention relates to a method of servicing a blade mounted on a wind turbine, said method comprising attachment of servicing equipment to at least one attachment device in the blade, said attachment device being attached at and accessible from the blade exterior.

One embodiment of the method according to the invention further relates to positioning of the blade in an essentially horizontal position and/or turning the blade about its longitudinal axis. Hereby all areas of the blade can be made accessible with a view to repair or other kind of servicing, and moreover the blade can be positioned optimally relative to attachment of eg a working platform or a covering tent. Turning of the blade about its longitudinal axis or pitching of the blade may also cause the front and rear edges of the blade to face upwards or downwards as needed in connection with the servicing. The horizontal working position also enables that it is possible to cut a hole in the blade and allow a person to stand safely within the blade and repair and service the blade from within.

Moreover the present invention relates to a method of servicing a blade in accordance with the above, where safety lines for crew, a covering tent or a working platform are attached to at least one attachment device in the blade. The advantages are, as mentioned above, that the blade may be serviced without use of lifting gear and that it is possible to repair large areas on the blade in well-controlled conditions.

BRIEF DESCRIPTION OF THE DRAWINGS

In the following the invention will be described with reference to the figures, wherein

FIGS. 4-6 shows various options for securing a working platform to a blade of a wind turbine by means of attachment means according to the invention;

DESCRIPTION OF EMBODIMENTS

Figure 1:
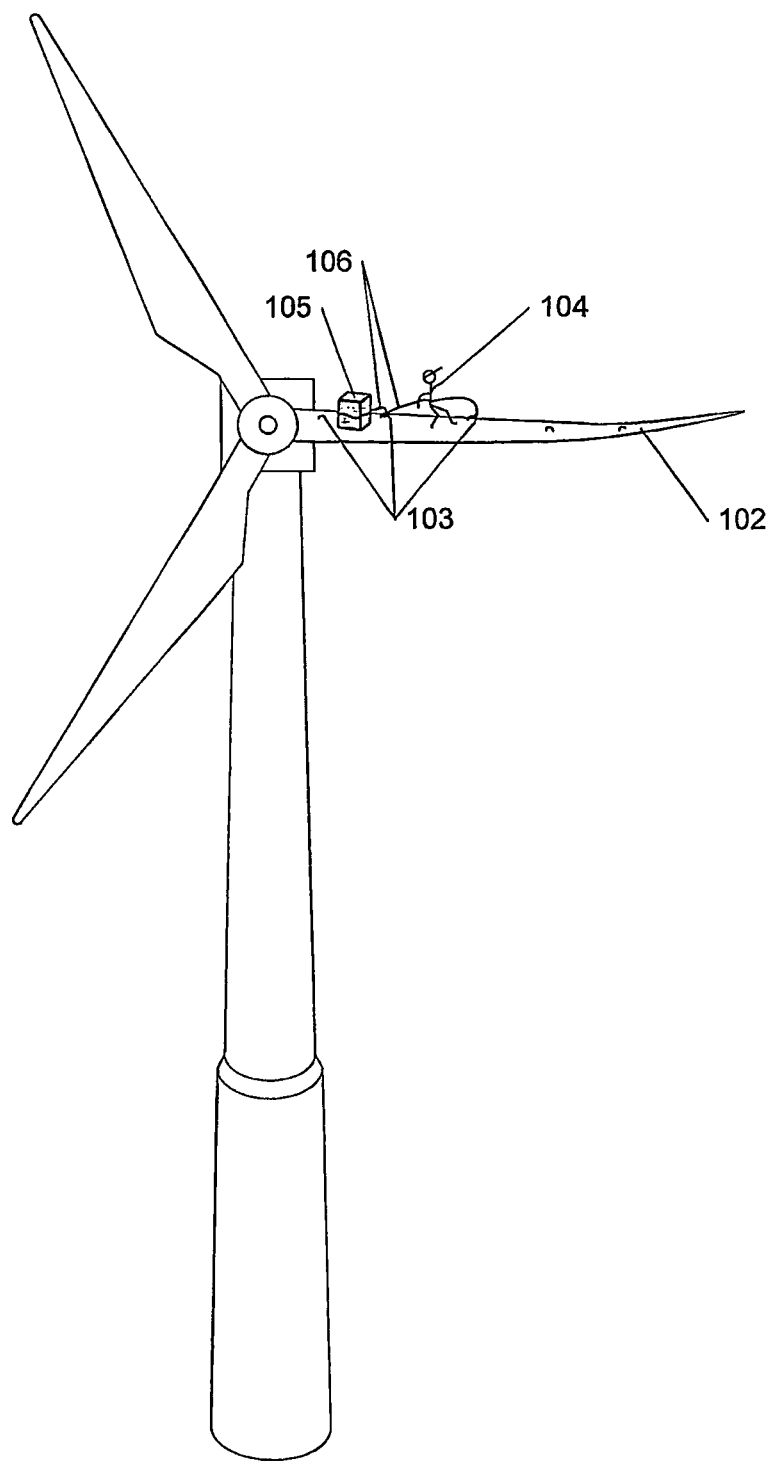
FIG. 1 shows servicing on a blade of a wind turbine according to the invention.

FIG. 1 shows a wind turbine 101, seen from the front, wherein the one of the pre-curved blades 102 is positioned in its horizontal or approximately horizontal position in order to enable repair or servicing in accordance with the invention. Usually a blade is repaired or inspected while in its vertical position while the crew 104 are in suspended working platforms or are suspended from the nacelle and rappel down the blade. As shown in FIG. 1 the blade according to the invention is equipped with a number of attachment devices 103 to which crew 104 and/or servicing equipment 105 can be attached. Hereby it is accomplished that the crew 104 is able to move about safely on the blade 102 as such while it is in its horizontal position. This also enables that it is possible to repair more comprehensive and more complex damage to the blade than would otherwise have been possible on vertical faces, and it follows that it is more frequently possible to avoid the costs involved in dismounting and replacing the damaged blade. Simultaneously the method is associated with the advantage that the blades can be inspected or repaired without the use of a crane or the like, which is an advantage in particular where offshore wind turbines are concerned. The attachment devices 103 are, according to the invention, entirely or partially covered when not in use, whereby, in operation, the aerodynamic properties of the blade are influenced minimally by be devices. It is conceivable that the attachment devices 103 are configured for attachment of both lines and wires 106 as well as miscellaneous kinds of bars and rails or the like. Various embodiments of such attachment means are shown in FIGS. 9-16.

Figure 2:
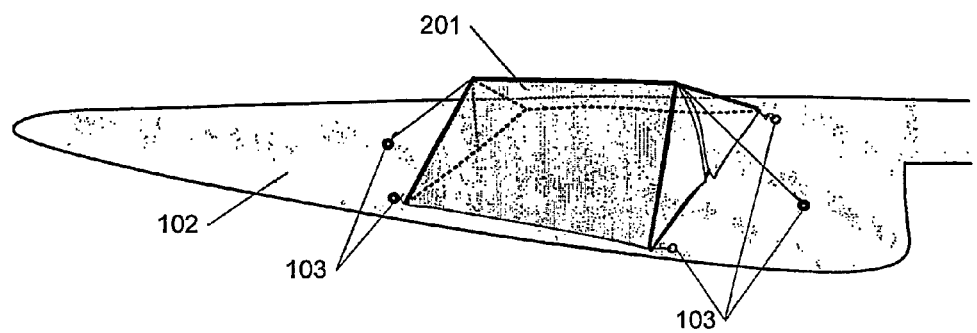
FIG. 2 shows a covering tent attached on a blade for a wind turbine.

FIG. 2 shows a blade 102 mounted on a wind turbine (not shown), on which a covering tent 201 is positioned. The tent is attached to the blade by means of attachment devices 103 on the blade and hereby serve to ensure, on the one hand, improved working conditions for the crew (shelter and cover) and, on the other, optimum conditions over a larger area for given repairs, eg specific temperatures, limited humidity, etc. Likewise, the tent can be of such configuration as to enclose the blade eg by some kind of extra bottom being configured underneath the blade and where the tent thus also serves as a safety net for crew at work.

Figure 3:
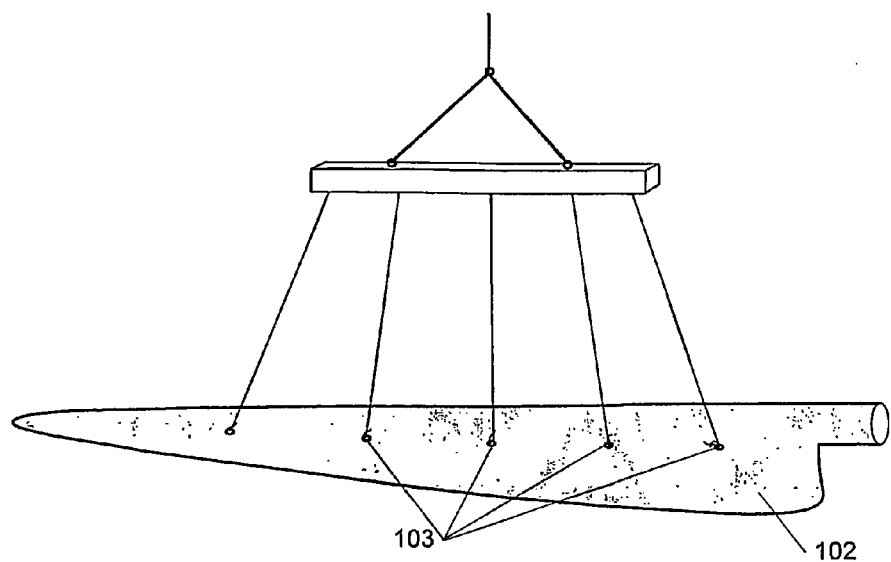
FIG. 3 shows mounting of a blade on a wind turbine by means of a number of attachment devices according to the invention.

The attachment devices 103 according to the invention may also be advantageous in the context of transportation and mounting of the blades on the wind turbine. By completely or partially lifting the blade in the attachment means 103 as illustrated in FIG. 3, a more evenly distributed load on the blade is accomplished compared to a scenario in which the blade is lifted in a few straps fitted around the blade. Likewise, improved check and control of the blade movements are accomplished.

In the following FIGS. 4-6, various ways are shown in which a working platform 401 or other servicing equipment can be attached to the attachment devices 103 according to the invention. In all of the figures, a blade 102 is section in cross-sectional view and turned to various degrees about the longitudinal axis of the blade.

FIG. 4 outlines how a working platform 401 according to one embodiment of the invention can be positioned underneath a blade 102 and hereby enable servicing on the bottom face of the blade. In the example shown the working platform 401 is attached to attachment devices 103 on the top face of the blade. Likewise, it is conceivable that the attachment devices that the attachment devices are positioned on the bottom face of the blade or on both sides. An alternative option for repairing or inspecting the bottom face of the blade is by allowing the blade to turn half a round about its longitudinal axis and to service it from above. In FIG. 4, the working platform is outlined as suspended in wires 402, but it is also an option that it is suspended in bars or constructed as scaffolding or the like.

FIGS. 5 and 6 illustrate how the rear edge 501 and fore edge 601 of the blade can be serviced in accordance with embodiments of the invention. By turning of the blade 102 about its longitudinal axis, the blade can be positioned with fore or rear edge facing downwards, whereby a working platform 401 or a frame can be built to reach above or below the area of the blade which is to be inspected or repaired. FIG. 5 shows a working platform which is suspended underneath the rear edge 501 of the blade and is suspended from a number of attachment devices 103 on the blade 102.

FIG. 6 shows a platform or scaffolding built across the fore edge of the blade 601. Likewise, conceivably the blade can be turned about its longitudinal axis to a larger or smaller extent, depending on to which area on the blade it is desired to have optimal access.

Figure 7:
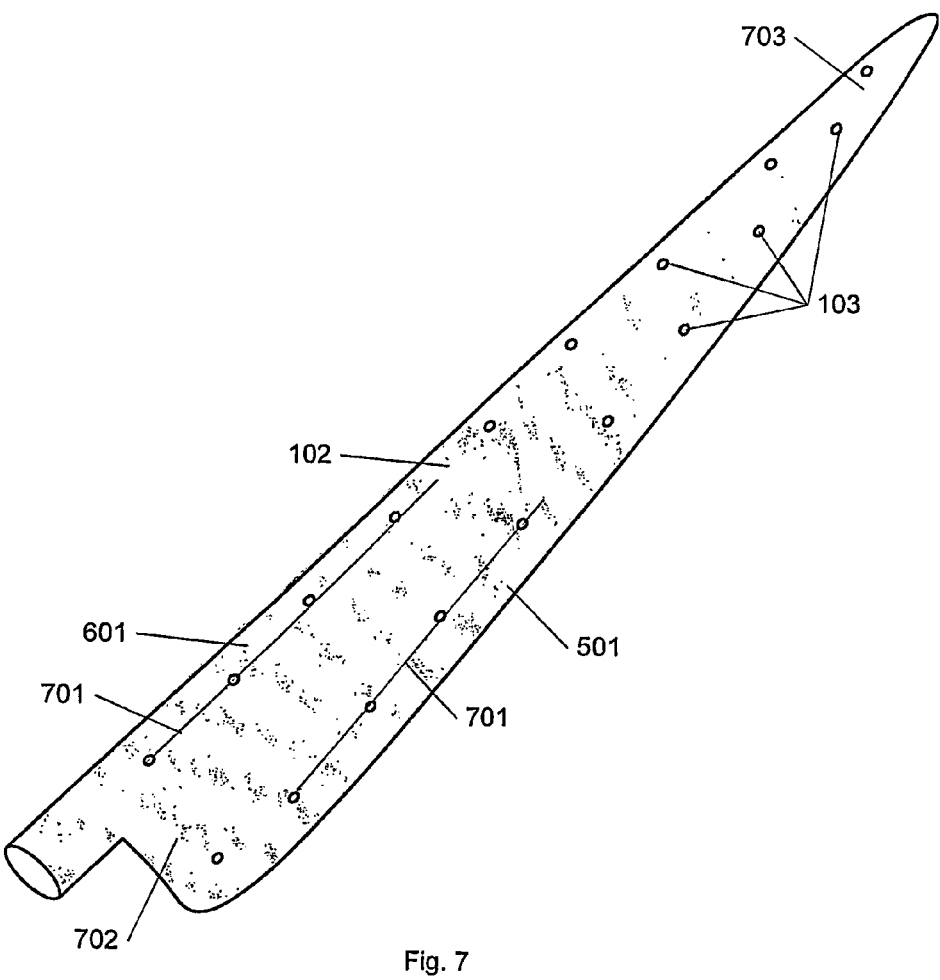
FIG. 7 shows possible positions of attachment devices on a blade.

As mentioned above, the blade can be equipped with a number of attachment devices 103 down along the blade as shown in FIG. 7, where the attachment devices are positioned in two rows 701 down along the front and rear edges 501, 601. According to one embodiment the devices are positioned closer to each other near the root 702 of the blade and at larger intervals outwards towards the blade tip 703, whereby a more even distribution of the load is accomplished if the blade is lifted in the attachment devices. According to one embodiment the attachment devices are positioned in straight rows to enable mounting of rails therein. Such rails may be advantageous in case equipment is to be transported on the rail or optionally to enable sliding securing of crew who are able to pull the safety line behind them. It is thus also possible to use a number of safety devices for a cable to be extended between, to which a safety wire or the like can be attached. The attachment devices may furthermore serve several functions and be used to advantage to a number of tasks, such as eg being provided with light, serving as multi-receptors for lightning protection, as suspension for advertising banners or as fixing points for aerodynamic features such as spoilers or flaps.

Figure 8:
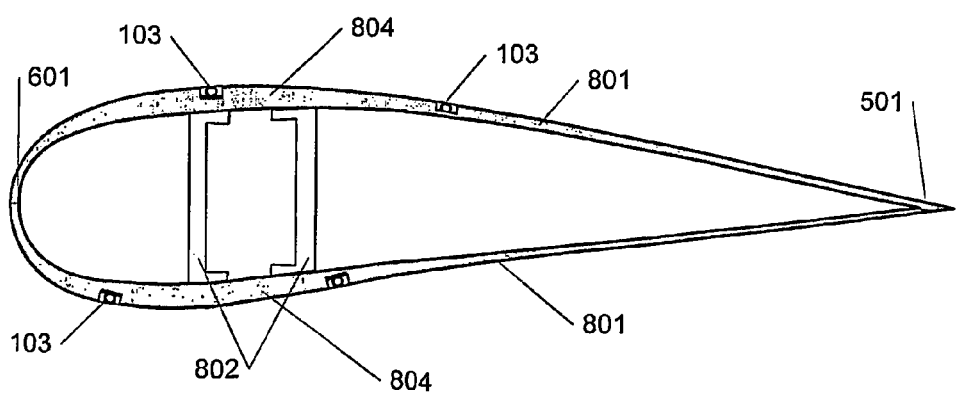
FIG. 8 shows a cross sectional view of a blade with various locations for attachment means according to the invention.

FIG. 8 is a cross-sectional view of various arrangements of attachment devices 103 in or at the blade shell 801. The attachment means as such are shown in greater detail in the figures that follow. Most often a blade is made of two or more blade shells 801 with joints a front and rear edge 501, 601 and with internal bracing beams 802. The attachment devices 103 are mounted such that they are accessible to crew from the blade exterior. It is important to the aerodynamic properties of the blade that the attachment devices are configured and positioned such that they cannot at all or only to a minimal extent reach above the blade surface. To obtain that the attachment devices have the largest possible strength, they can be positioned in the main laminates 804 of the blade shells, both on the bottom face and the top face of the blade, ie in the areas across the bracing beams 802, where the laminates are thickest and have the highest strength and rigidity. Devices positioned more proximate the fore edge and rear edge 501, 601 of the blade may also be advantageous for making it possible to latch somebody or something onto a large area of the blade 102.

FIGS. 9-16 show various embodiments of attachment means according to the invention. However, they serve merely to exemplify illustrative embodiments, and the invention is not in any way limited to them.

Figure 9:
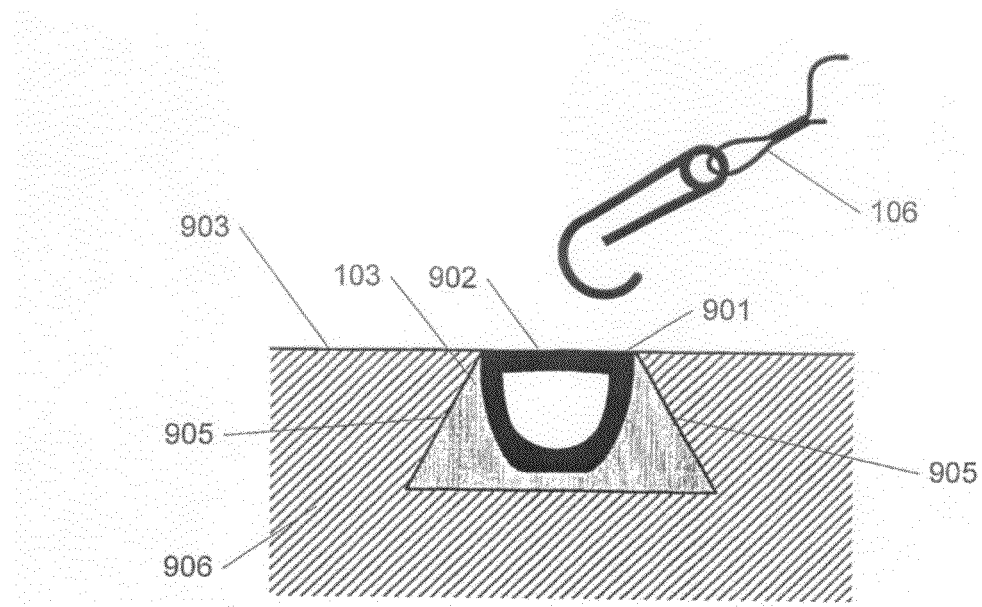
FIG. 9 shows an embodiment of an attachment device on a blade in a cross sectional view.

FIG. 9 is a cross sectional view of an attachment device comprising an eye 901 to which a line 106 or the like can be hooked on in any other way attached. In the embodiment the eye surface 902 flushes with the blade surface 903 which ensuingly has an approximately uninterrupted appearance. In case of blade shells made of fibre-reinforced laminates, the attachment devices may advantageously be moulded integrally with the laminate. In that case, as shown in the figure, the device is advantageously provided with outwardly tapering surfaces 905 on the device, whereby an optimal securing in the laminate 906 is accomplished. Moreover, it is an option that the attachment devices may be attached to the blade by bolts, screws or the like.

Figure 10:
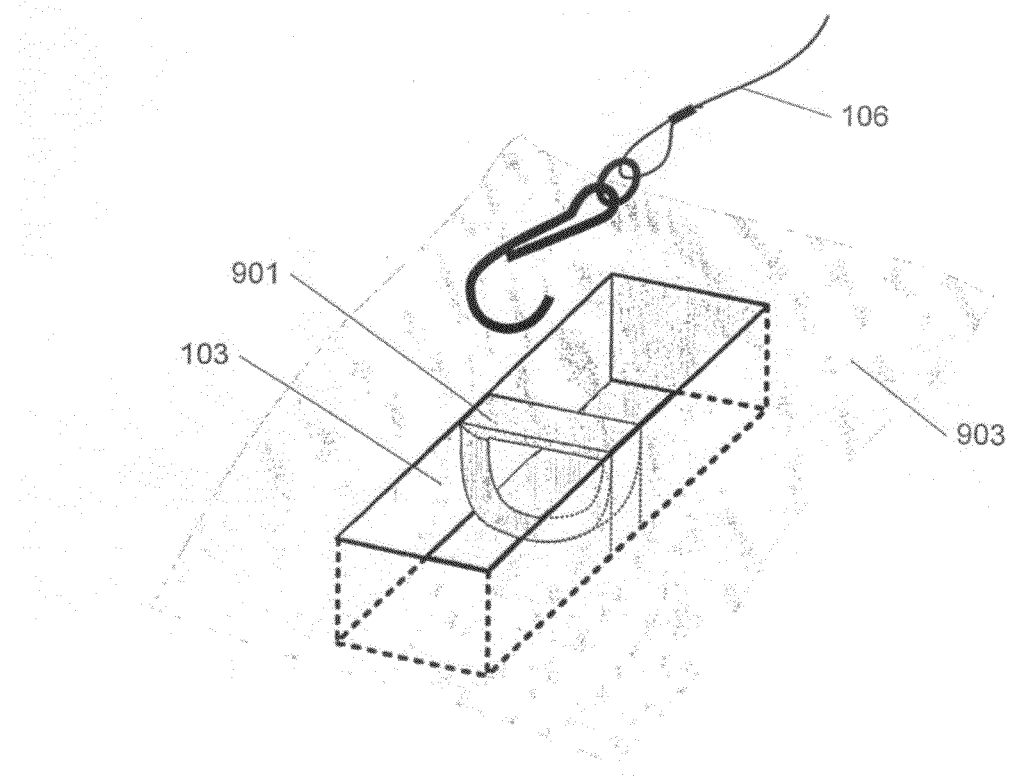
FIG. 10 shows a further embodiment of an attachment device on a blade, seen in an inclined view from above.

FIG. 10 outlines an attachment device similar to the one shown in FIG. 9, seen in an inclined view from above. The attachment device is countersunk into the blade, whereby the cavity around the eye 901 can be covered when the device is not in use and the blade surface 903 remains even. The particular configuration of the opening leading to the eye 901 may assume very different shapes and is of no consequence to the present invention.

Figure 11:
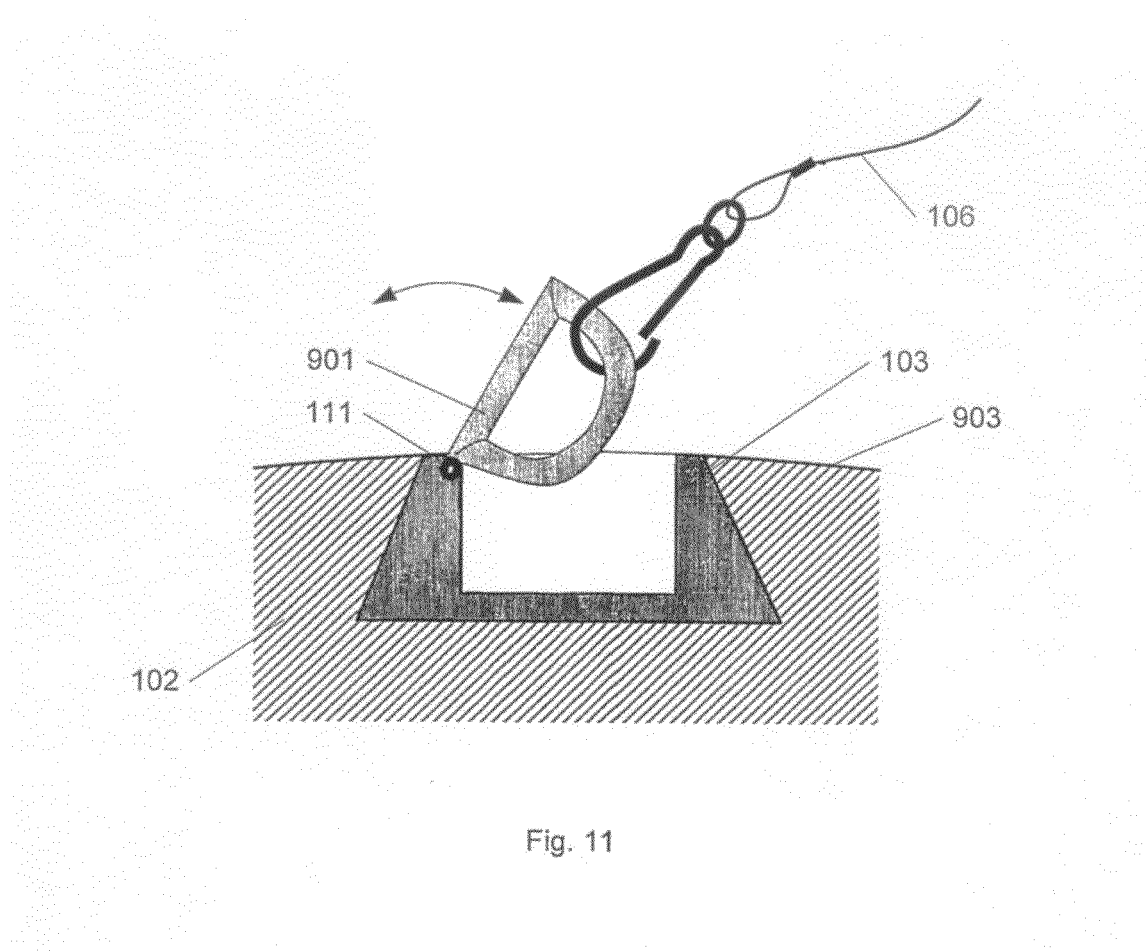
FIGS. 11-13 show various embodiments of attachment means according to the invention.

FIG. 11 is also a cross-sectional view of an attachment device 103 comprising an eye 901 to which servicing equipment (here a line 106) can be attached. Like in FIG. 9 the attachment device 103 is countersunk into the blade 102, whereby its surface 903 remains uniform and approximately uninterrupted when the device 103 is not in use. In the embodiment the eye 901 is turnably mounted by means of a hinge 11 and is tipped outwards when the device is to be used. Following use the eye is quite simply pushed back into place.

Figure 12:
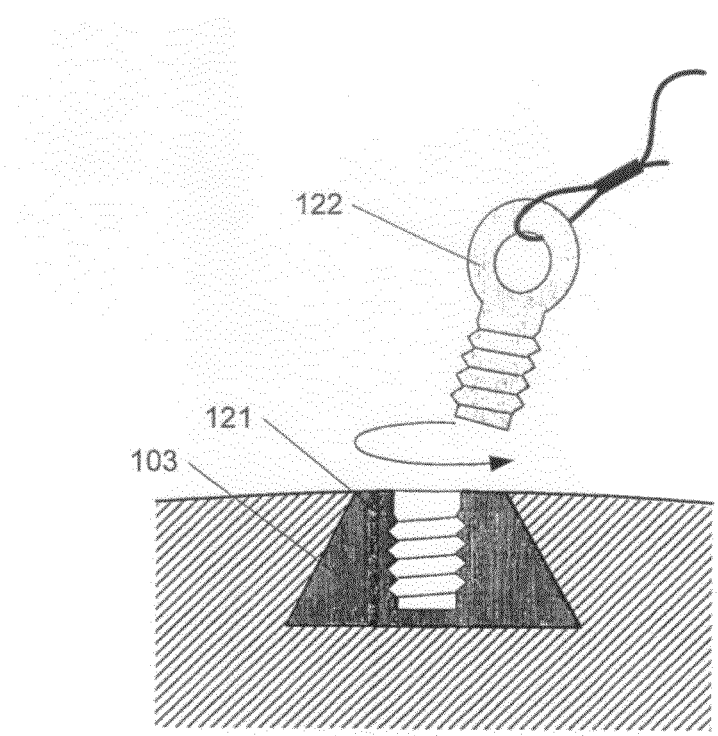
Figure 13:
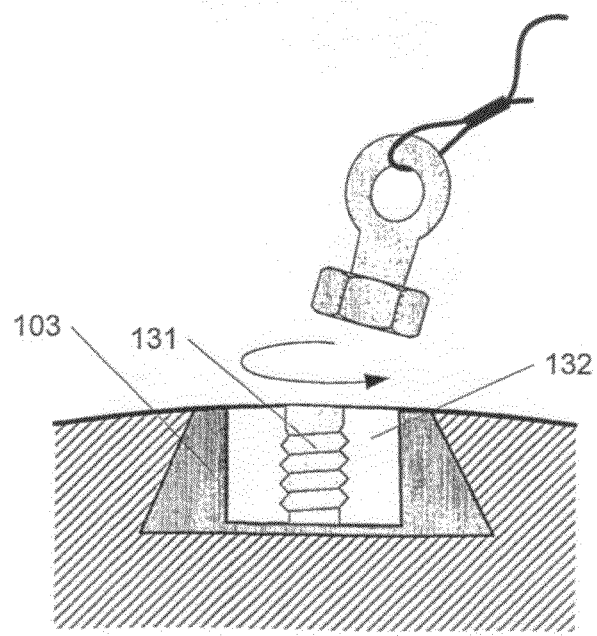

Likewise, the attachment devices may be configured with thread 121 as shown in FIGS. 12 and 13. In the former figure the thread 121 on the attachment device is internal and enables screwing home of bolts 122, etc. In FIG. 13 the attachment device comprises a cavity 132 in which a bolt 131 is mounted.

Figure 14:
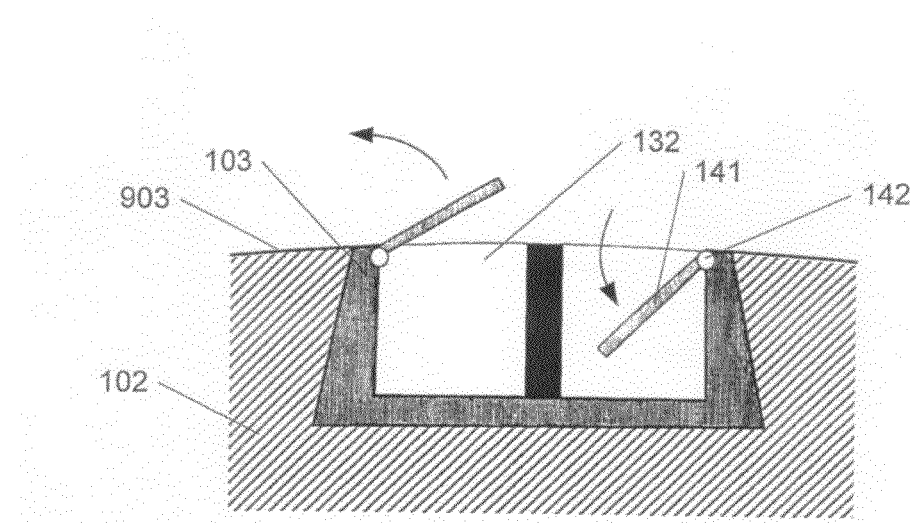
FIGS. 14-16 are cross-sectional views of various options for covering an attachment device according to the invention.
Figure 15:
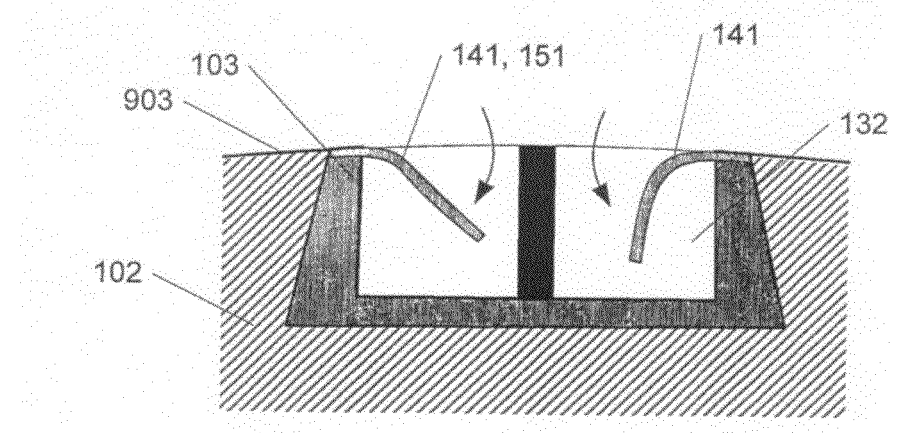
Figure 16:
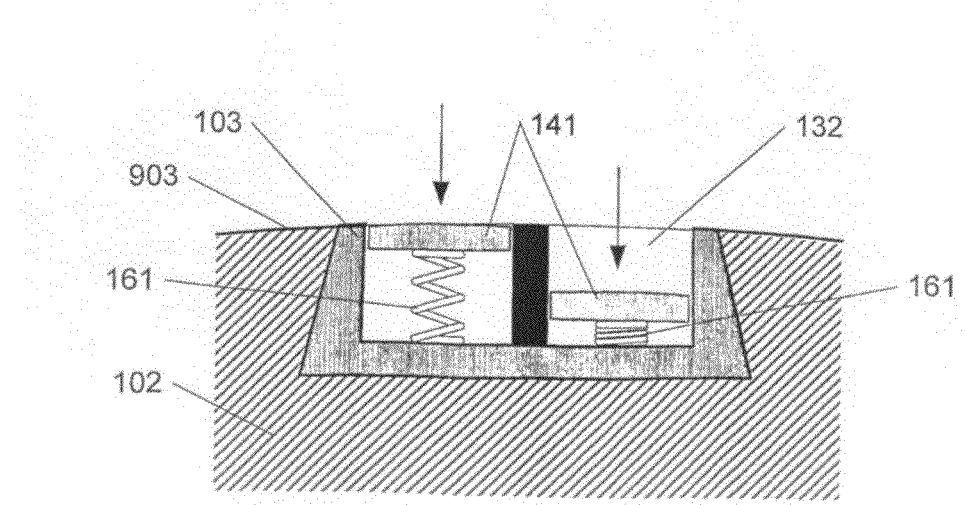

FIGS. 14-16 illustrate various ways in which to completely or partially cover the attachment means 103. In the shown embodiments the devices are all embedded in the blade 102, to the effect that their surfaces are, in the covered state, flush with the blade surface 903. Whether or not the attachment device comprises an eye or a thread or the like, it is an option that the cavity 132 may be covered by one or more flaps 141. They may be mounted by means of a hinge 142 as shown in FIG. 14 and be intended for tipping upwards or pressing inwards to proved access to the attachment device. Likewise, the flaps may be made of a resilient material 151 such as eg a rubber or a soft plastics material. This is shown in FIG. 15. A further embodiment is shown in FIG. 16, where the flaps 141 are mounted by spring 161 and can be pressed downwards into the cavity.

According to one embodiment of the invention the cavity is, during moulding of the blade, filled with eg foam or the like and coated with gel-coat like the remainder of the blade; its location being, however, indicated in some way or other. When or if a need arises to access the attachment means, access is readily provided thereto by breaking the surface. After use, the cavity is filled again, and the surface is evened out by application of a top-coat.

It will be understood that the invention as disclosed in the present specification and figures can be modified or changed while continuing to be comprised by the protective scope conferred by the following claims.

The invention claimed is:

1. A blade for a wind turbine, comprising at least one attachment device for attachment of servicing equipment selected from the group comprising safety lines for crew, safety nets, working platforms, a covering tent, equipment rails, crew rails,
    said servicing equipment is for servicing and repair of the blade while the blade is mounted on a rotor,
    said attachment device being attached at and accessible from the blade exterior.

2. A blade for a wind turbine according to claim 1, wherein the attachment device is positioned such that the blade surface is essentially even when the attachment device is not in use.

3. A blade for a wind turbine according to claim 1, wherein top face of the attachment device is flush with the blade surface when the attachment device is not in use.

4. A blade for a wind turbine according to claim 1, wherein the attachment device is at least partially covered by a flap when the attachment device is not in use.

5. A blade for a wind turbine according to claim 1, comprising a number of attachment devices positioned down along the front and rear edge of the blade.

6. A blade for a wind turbine according to claim 1, comprising a number of attachment devices on both sides of the blade.

7. A blade for a wind turbine according to claim 1, comprising a number of attachment devices positioned down along the blade in a main laminate.

8. A blade for a wind turbine according to claim 1, wherein the attachment device comprises a thread.

9. A blade for a wind turbine according to claim 1, wherein the attachment device comprises an eye.

10. A blade for a wind turbine according to claim 1, wherein the attachment device comprises light sources.

11. A blade for a wind turbine according to claim 1, wherein the attachment device comprises lightning conducting means.

12. A wind turbine comprising at least one blade as described by claim 1.

13. A method of servicing a blade mounted on a wind turbine, said method comprising attaching servicing equipment selected from the group comprising safety lines for crew, safety nets, working platforms, a covering tent, equipment rails, crew rails, to at least one attachment device in the blade, said servicing equipment is for servicing and repair of the blade while the blade is mounted on a rotor and said attachment device being attached at and accessible from the blade exterior.

14. A method of servicing a blade in accordance with claim 13, further comprising to attach safety lines for crew to at least one attachment device in the blade.

15. A method of servicing a blade in accordance with claim 13, further comprising to position the blade in an essentially horizontal position.

16. A method of servicing a blade in accordance with claim 13, further comprising to turn the blade about its longitudinal axis.

17. A method of servicing the blade in accordance with claim 13, further comprising to attach a covering tent to at least one attachment device in the blade.

18. A method of servicing a blade in accordance with claim 13, further comprising to attach a working platform to at least one attachment device in the blade.

* * * * *